United States Patent [19]
Gioutsos

[11] Patent Number: 5,508,918
[45] Date of Patent: Apr. 16, 1996

[54] PREDICTOR/CHECK CRASH DISCRIMINATOR

[75] Inventor: Tony Gioutsos, Brighton, Mich.

[73] Assignee: Automotive Systems Laboratory, Inc., Farmington Hills, Mich.

[21] Appl. No.: 773,017

[22] Filed: Oct. 8, 1991

Related U.S. Application Data

[63] Continuation-in-part of Ser. No. 709,891, Jun. 4, 1991, Pat. No. 5,363,302.
[51] Int. Cl.$^6$ .................................................. B60R 21/32
[52] U.S. Cl. .................. 364/424.05; 280/735; 180/282; 340/436
[58] Field of Search ................. 364/424.05; 280/735; 180/274, 282; 340/436

[56] References Cited

U.S. PATENT DOCUMENTS

| | | | |
|---|---|---|---|
| 3,911,391 | 10/1975 | Held et al. | 280/735 |
| 4,020,453 | 4/1977 | Spies et al. | 280/735 |
| 4,381,829 | 5/1983 | Montaron | 364/424.04 |
| 4,984,651 | 1/1991 | Grösch et al. | 180/268 |
| 4,985,835 | 1/1991 | Sterler et al. | 364/424.05 |
| 5,038,134 | 8/1991 | Kondo et al. | 340/438 |
| 5,068,793 | 11/1991 | Condne et al. | 364/424.05 |
| 5,073,860 | 12/1991 | Blackburn et al. | 364/424.05 |
| 5,076,745 | 12/1991 | Yoshikawa | 280/735 |
| 5,081,587 | 1/1992 | Okano | 364/424.05 |
| 5,083,276 | 1/1992 | Okano et al. | 364/424.05 |
| 5,157,268 | 10/1992 | Spies et al. | 307/10.1 |

*Primary Examiner*—Vincent N. Trans
*Attorney, Agent, or Firm*—Lyman R. Lyon

[57] ABSTRACT

A system and method for triggering deployment of a vehicle air bag in response to a crash or sudden vehicle deceleration wherein a modified acceleration value is obtained by subtracting a correction term from data representative of sensed instantaneous vehicle acceleration; integrating the modified acceleration value to obtain a modified velocity value; estimating the transitory jerk of the acceleration data using a rank filter; obtaining the product of the estimated transitory jerk and the modified velocity; comparing the resulting velocity-jerk product to a threshold value therefor; and triggering deployment of the air bag when the velocity-jerk product exceeds the threshold value therefor.

19 Claims, 6 Drawing Sheets

PREDICTOR/CHECK CRASH DISCRIMINATOR

CROSS-REFERENCE TO RELATED APPLICATIONS

The instant application is a continuation-in-part of U.S. patent application Ser. No. 709,891, entitled "Power Rate System and Method for Actuating Vehicle Safety Device," filed by applicant on Jun. 4, 1991, and assigned to the assignee of the instant invention, now U.S. Pat. No. 5,363,302.

BACKGROUND OF THE INVENTION

The instant invention relates to systems and methods for triggering the deployment or actuation of vehicular safety devices and, more particularly, to a prediction-based system and method which anticipates conditions requiring such deployment or actuation of the safety devices to provide superior response thereto.

A variety of systems for actuating vehicular safety devices are well known in the art. Such systems are used to sense a crash condition and, in response to such a condition, to actuate an air bag, or lock a seat belt, or actuate a pretensioner for a seat belt retractor. Typically, the safety device is actuated or deployed into its protective position when an impact exceeding a predetermined magnitude is detected by the actuating system.

One prior art method for crash detection integrates the output of an electronic acceleration sensor over time and compares the result against a time-varying threshold velocity. A major drawback of this method is its need for determining when to start running the time-varying threshold, i.e., when the reference time for the time-varying threshold is to be reset to zero time. Another problem associated with the integration method of crash detection is that crash severity cannot be determined early enough for high-speed angular, partial barrier, or pole crashes. Moreover, the wide "grey area" between "fire" and "no-fire" conditions for low-speed crash conditions often results in an inadvertent deployment of the safety device when deployment is unnecessary, or nondeployment of the safety device when deployment is necessary.

Still further, raw velocity is not a particularly good measure of the effect of a crash on the human body. One criterion often employed with the integration method is the "5 inch—30 msec" rule, which states that an air bag should fire 30 msec prior to the time in which the passenger to be protected thereby will have moved 5 inches. Unfortunately, the passenger may well move forward 5 inches during a normal vehicle braking pattern-a condition in which air bag deployment would not only be undesirable but extremely hazardous.

Other prior art methods for assessing crash severity attempt to deemphasize the use of simple velocity calculations and instead calculate values for vehicle "jerk," i.e. the slope of the acceleration data; or the energy dissipated during a crash. Unfortunately, experience has shown that jerk alone is incapable of properly discriminating between conditions requiring actuation of a vehicle safety device and conditions where such actuation is either unnecessary or undesirable. Moreover, the "energy method" continues to utilize velocity information, resulting in the same types of deployment problems and slow response times as are encountered with the integration method. Additionally, the energy method is further limited in that it is accurate only over short time intervals.

SUMMARY OF THE INVENTION

It is an object of the instant invention to provide a prediction-based system and method for crash detection which can reliably and instantaneously detect crash severity earlier than an integration, jerk, or energy algorithm, and over a wider variety of circumstances and a wider time interval than is currently possible.

Another object of the instant invention is to provide a system and method for crash detection that is event-based rather than timer-based.

The instant system for actuating a vehicle safety device in the event of a vehicle crash or sudden vehicle deceleration comprises means for generating sampled data representative of the instantaneous acceleration of the vehicle; a RAM for storing consecutive values of the acceleration data; means for providing an acceleration correction value corresponding to a value of instantaneous vehicle acceleration to which the vehicle passenger can himself resist; means for subtracting the correction value from the consecutive values for the acceleration data to obtain corrected acceleration data; means for integrating (summing) the corrected acceleration data to determine a modified vehicle velocity value; means for determining a transitory jerk value based on a predetermined number of consecutive values for the acceleration data stored in the RAM; means for multiplying the modified vehicle velocity value and the transitory jerk value to obtain a velocity-jerk product; and means responsive to the velocity-jerk product for actuating the vehicle safety device when the velocity-jerk product exceeds a threshold value therefor.

Under the instant method, a correction value $a^*$ is subtracted from the raw acceleration data obtained by sampling the output of a suitable vehicle acceleration sensor to obtain corrected acceleration data. The correction value $a^*$ represents an acceleration that a passenger with a seat belt can be expected to overcome and may be either a constant or a function of time, jerk, or other suitable parameter. A damped or "modified" velocity term $v^*$ is then calculated by integrating (summing) the corrected acceleration data. The modified velocity is thereafter multiplied with the transitory jerk and compared with at least one threshold to determine whether the air bag should be deployed. Thus, it may be said that the instant invention employs damping to reduce the effects of acceleration in the calculation of a velocity term which is thereafter multiplied by the transitory jerk and compared with at least one threshold.

BRIEF DESCRIPTION OF THE DRAWINGS

FIG. 6 is an illustration of a general schematic of an exemplary crash discriminator constructed in accordance with the instant invention.

DETAILED DESCRIPTION OF THE PREFERRED EMBODIMENT OF THE INVENTION

Figure 1A:
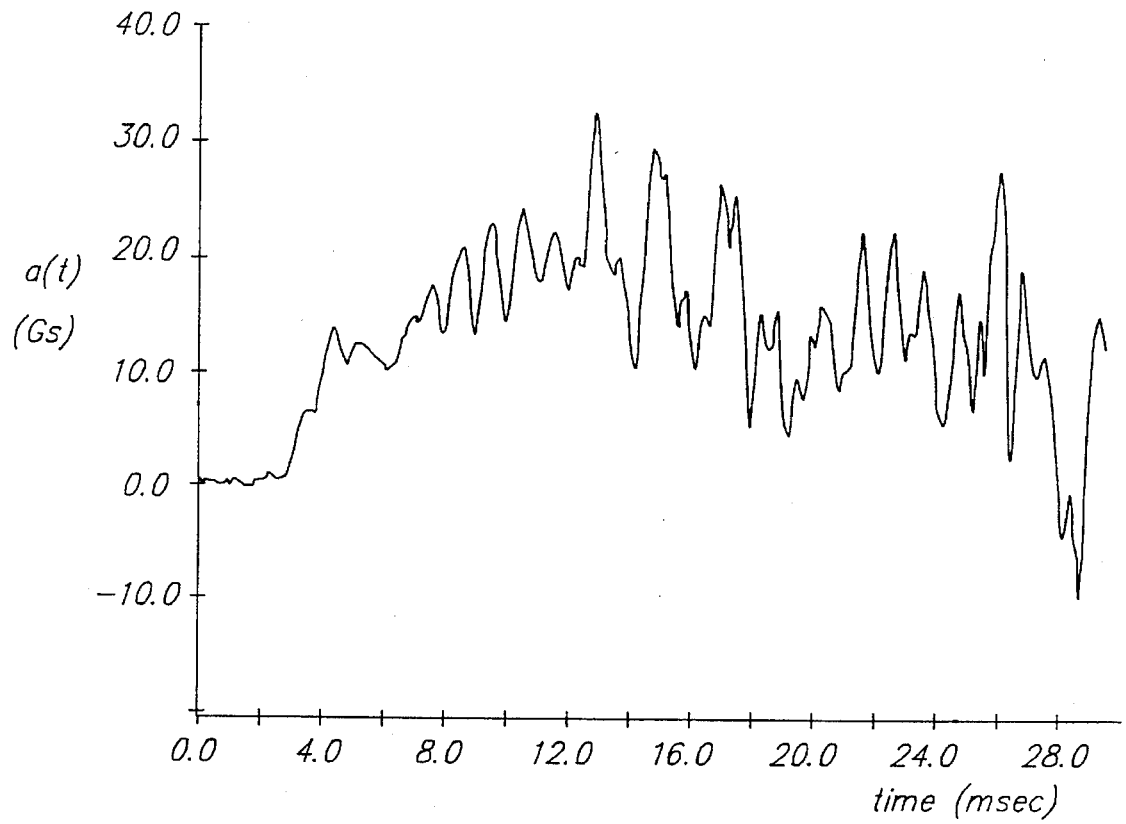
FIGS. 1A and 1B illustrate a typical vehicle crash acceleration input signal and typical rough road acceleration input signals, respectively.

Under the instant invention, a modified velocity term is calculated by subtracting a correction value from each acceleration value before integrating. The correction value represents an acceleration that a passenger with a seat belt can be expected to himself resist, and may be either a constant or perhaps a function of the transitory slope and/or the product of the transitory slope and the modified velocity, as those terms will be more fully defined hereinbelow.

For example, if the correction value is a constant equal to 2 Gs, then the passenger can be expected to resist a 2 G force upon him without requiring deployment of the air bag. Accordingly, upon experiencing a constant acceleration of 2 Gs, the passenger will resist or otherwise adjust to the resultant force upon him. Such is the case in the typical braking scenario, where a constant deceleration force of perhaps 0.5 Gs is applied to vehicle passengers, with the passenger experiencing a slight initial forward movement, after which the passenger adjusts to the braking force to halt such forward movement. This may explain why the automotive industry generally requires that an air bag not fire upon detecting a low MPH crash, such as an 8 MPH crash. Stated another way, a vehicle passenger wearing a seat belt can typically resist an average vehicle acceleration of about 7 Gs for 100 msec, with the instantaneous acceleration peaking as high as perhaps 15 Gs.

Under the instant invention, a value for modified velocity $v^*$ is calculated as follows:

$$v^* = \int [a(t) - a^*(t)] dt$$

where: $a(t)$=acceleration at time t, and $a^*(t)$=correction factor equal to acceleration to which a human passenger can be expected to resist or otherwise adjust, at time t The acceleration correction factor $a^*(t)$ employed by the instant system and method may vary with time t or may otherwise be a constant. It will be noted, however, that where the acceleration sensor is "one-sided", i.e., generates only positive G values while clipping negative acceleration inputs at zero, much of the raw data from rough road scenarios (characterized by positive and negative swings) is lost. Accordingly, under the instant invention, the jerk m, i.e., the slope of the acceleration data, is used to predict negative G values to be incorporated into the modified velocity term $v^*$, as follows:

$$a^* = \hat{a}, \quad \text{for } m \geq 0$$
$$= \hat{a} + bm, \quad \text{for } m < 0$$

where $\hat{a}$ and b are constants which are preferably chosen to compensate for variation in vehicle structure and the location of the acceleration sensor within the vehicle. For example, a sensor located in the crush zone will predict higher G values hitting the passenger(s) than will actually occur due to damping, which is a function of the structure of the vehicle. For simplicity, $v^*$ is assigned a value of zero if $v^* < 0$.

A rank-order filter is thereafter used to provide the median value of a set of acceleration values. The rank-order/median filter removes any wild variance data, such as high-frequency noise, EMI, or spiky crash data, while retaining significant "edge data," i.e. data relating to a slant-up or a step function.

The goal of a prediction-based crash discriminator is to accurately predict when a severe crash is going to occur from present-received data. This contrasts with known methods of crash detection which instead rely on a certain change in some physical quantity while varying a corresponding threshold value therefor with time to converge to a solution.

Accordingly, the instant invention seeks to predict where the acceleration is going and verify that the prediction is on target. If the crash waveform is modeled as a slant-up function having a slope equal to the transitory jerk m, the instantaneous vehicle acceleration $a(t)$ is:

$$a(t) = mt$$

Thus, at a future time $t^*$, the corresponding vehicle acceleration $a(t^*)$ is calculated as follows:

$$a(t^*) = mt^*$$

Stated in another manner, a future value for acceleration at time $t^*$ may be calculated using the transitory jerk m. Since the air bag is preferably deployed while the acceleration data is still increasing, i.e., on this positive slant-up, it is immaterial that the above equation for $a(t^*)$ is not perfect for all time, e.g., after the acceleration data has peaked and begins to nominally decrease. Indeed, experience has indicated that estimating the transitory jerk m over a short time is adequate for practicing the instant method, notwithstanding exclusion from the model for $a(t^*)$ of various data fluctuations which result from multiplicative and additive noise.

After predicting a value for acceleration at time $t^*$ using the jerk m of the acceleration data, the predicted acceleration value $a(t^*)$ is subsequently checked against the present acceleration value $a(t)$ when the current time t equals the prediction time $t^*$, as follows:

$$a(t) = mt$$

Figure 4:
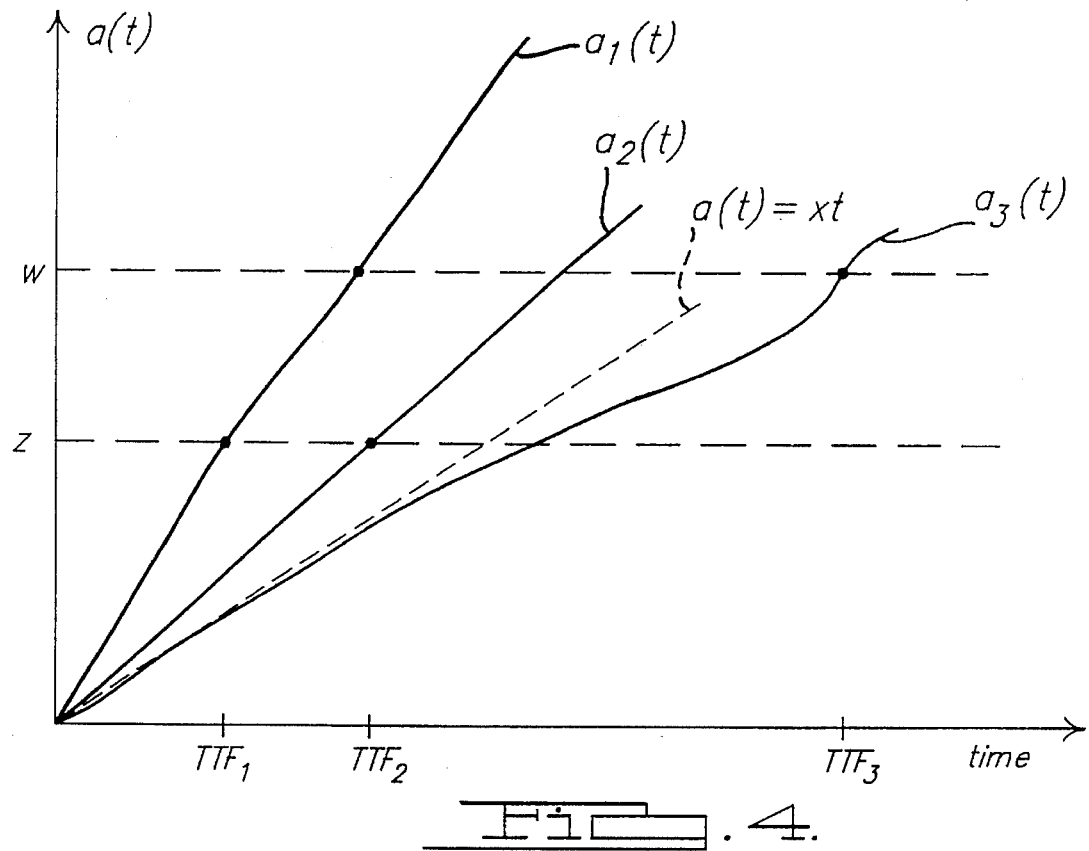
FIG. 4 is a plot of vehicle acceleration a(t) versus the time-to-fire of an air bag whose deployment is to be triggered by the instant system and method.

Referring to FIG. 4 of the drawings, wherein vehicle acceleration $a(t)$ is plotted against the time-to-fire ("TTF") of the air bag whose deployment is to be triggered by the instant system and method, the value for transitory jerk m must be at least as great as a predetermined minimum value x, with the air bag thereafter being triggered when vehicle acceleration $a(t)$ exceeds a baseline value z. For example, in FIG. 4, if $m_1$, $m_2$ and $m_3$ are the respective estimates for the slope or transitory jerk m of three acceleration profiles $a_1(t)$, $a_2(t)$ and $a_3(t)$, it will be seen that $m_1 > m_2 > x$ and, hence, the first acceleration profile $a_1(t)$ will cause a trigger signal to be generated at TTF, when $a_1(t)$ equals z, and the second acceleration profile $a_2(t)$ will cause a trigger signal to be generated at $TTF_2$ when $a_2(t)$ equals z. The air bag is thus triggered when the predicted slope m has a larger value than x and the actual acceleration $a(t)$ exceeds z.

Figure 5:
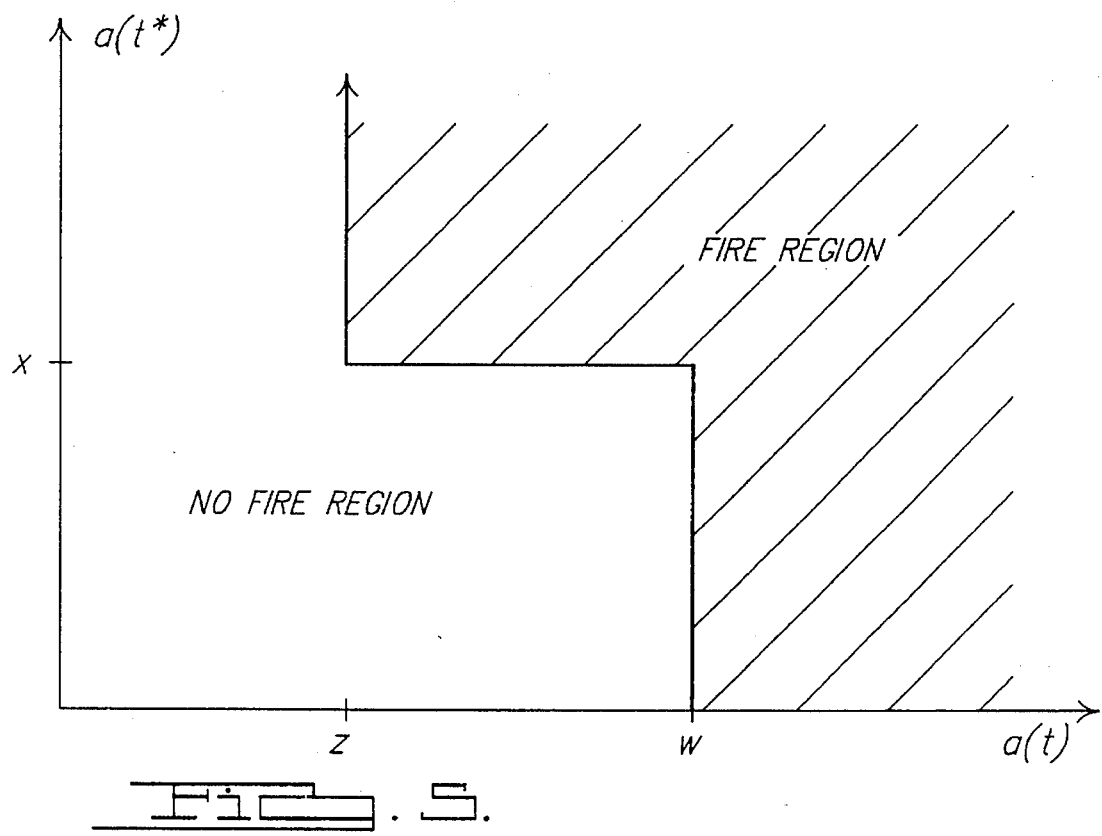
FIG. 5 is a plot of a two-dimensional signal space representing the air bag's firing threshold.
Figure 11:
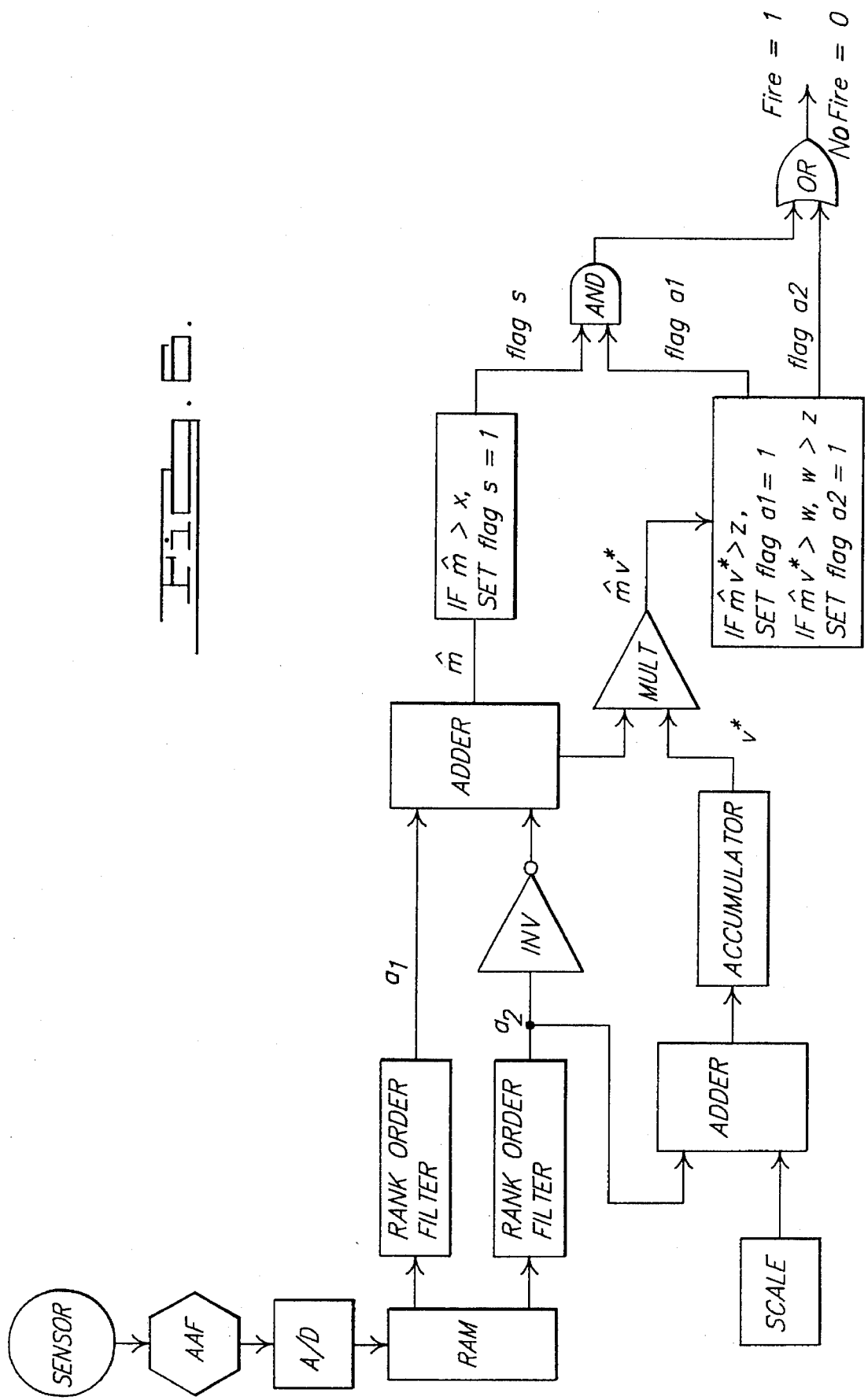

Preferably, an additional trigger criterion is employed to ensure deployment of the air bag during a severe crash which was not otherwise predicted by the above algorithm. Specifically, the air bag should preferably alternatively fire when $a(t) = w$. Hence, in FIG. 4, where the transitory jerk $m_3$ of the third acceleration profile $a_3(t)$ is less than x, the third acceleration profile $a_3(t)$ will nonetheless cause a trigger signal to be generated at $TTF_3$ when $a_3(t)$ equals w. A (second) trigger signal will similarly be generated when the first or second acceleration profiles $a_1(t)$ and $a_2(t)$ likewise cross threshold w. FIG. 5 is a two-dimensional signal space representing the firing thresholds outlined in FIG. 4. It is particularly significant that there is no time-varying threshold; rather, each axis reflects events rather than a time scale.

Figure 1B:
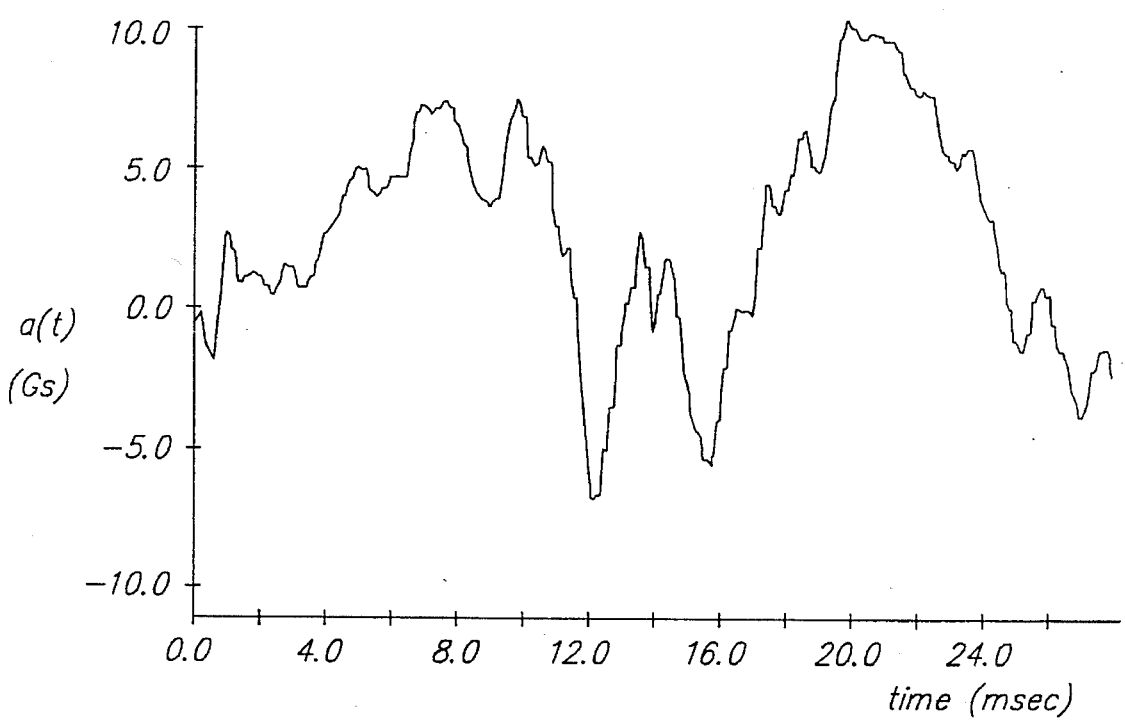
Figure 2A:
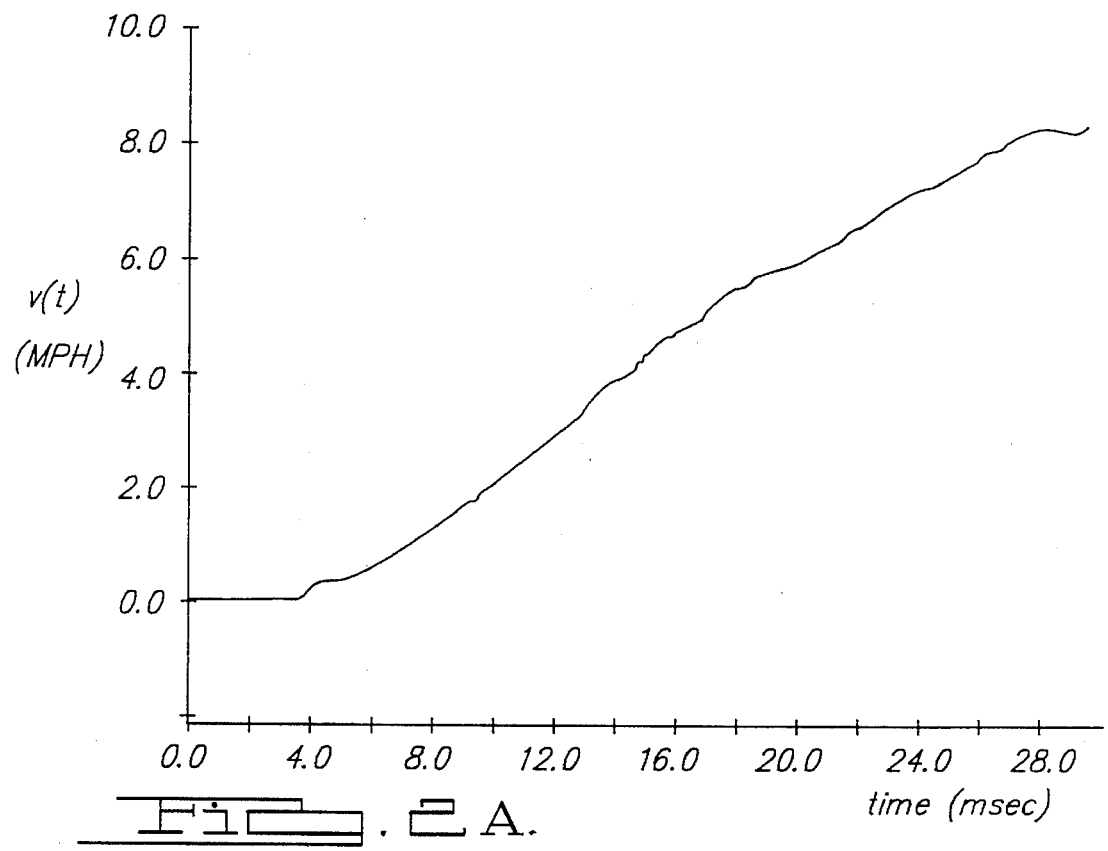
FIGS. 2A and 2B illustrate raw vehicle velocity based on the acceleration waveforms of FIGS. 1A and 1B, respectively.
Figure 2B:
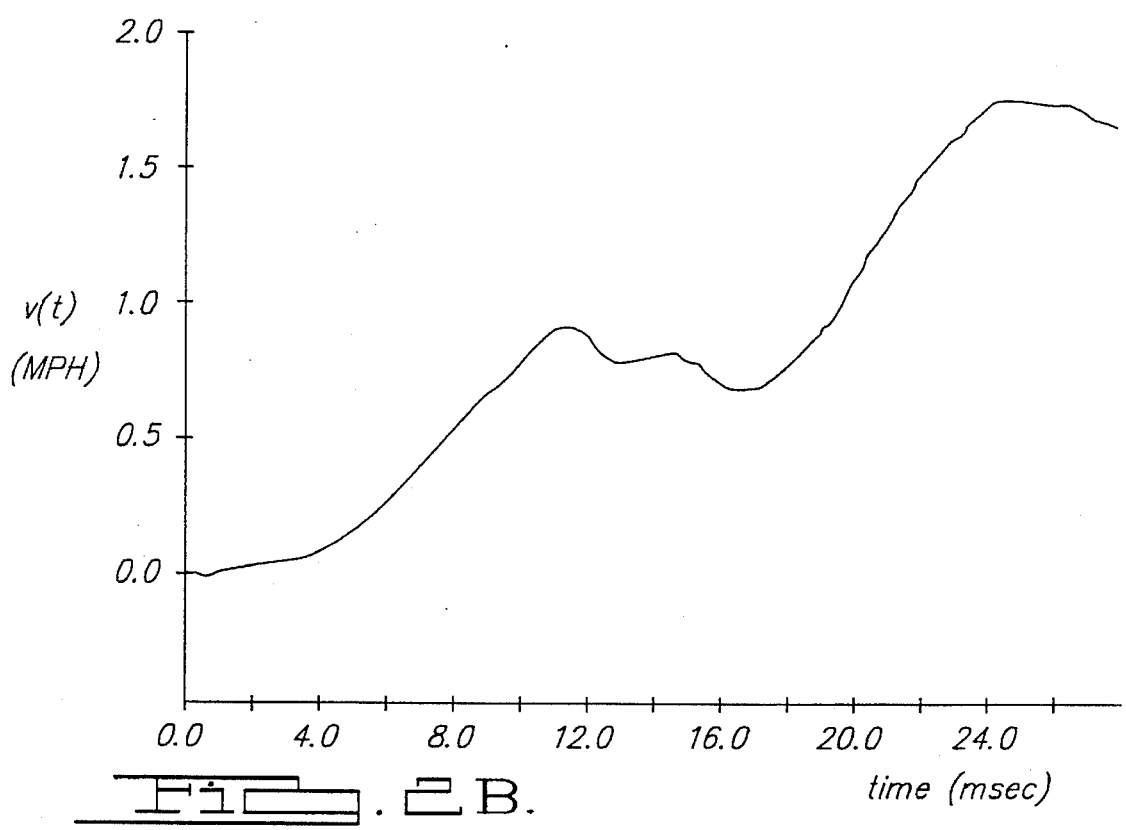
Figure 3A:
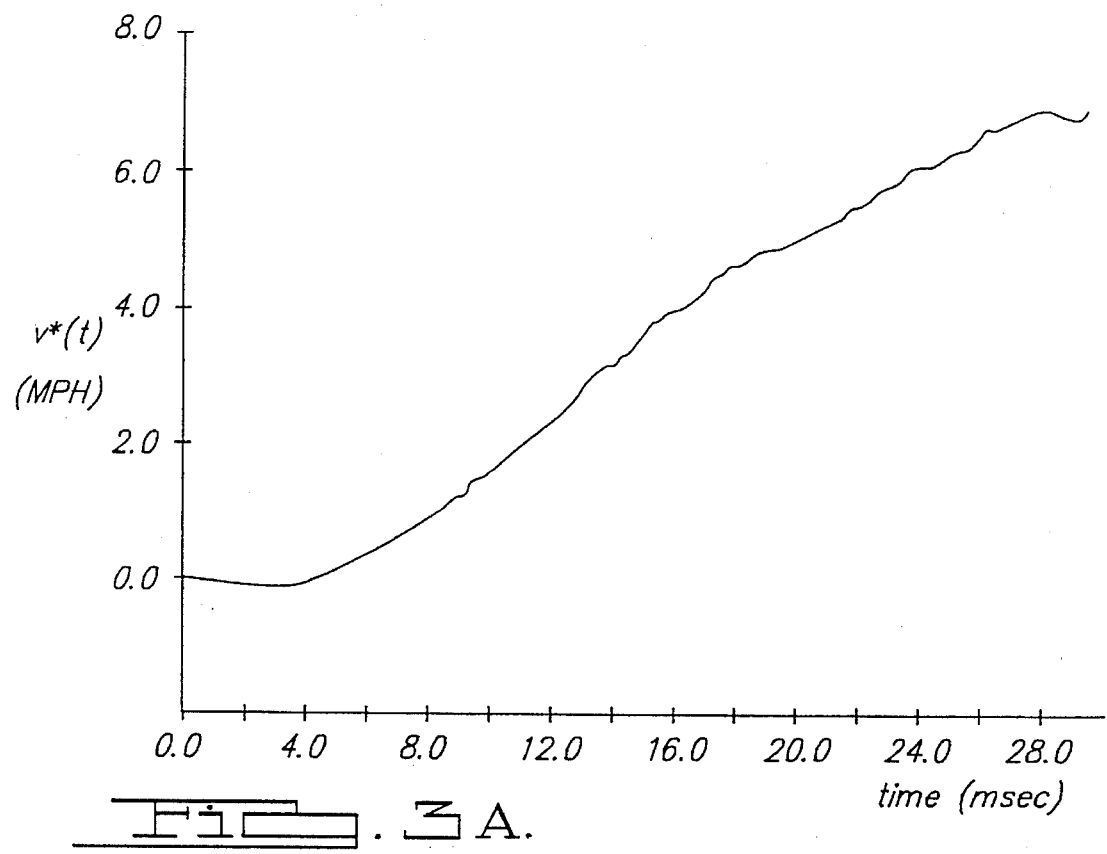
FIGS. 3A and 3B illustrate modified vehicle velocity signals based on the acceleration waveforms of FIGS. 1A and 1B, respectively, as calculated in accordance with the instant method.
Figure 3B:
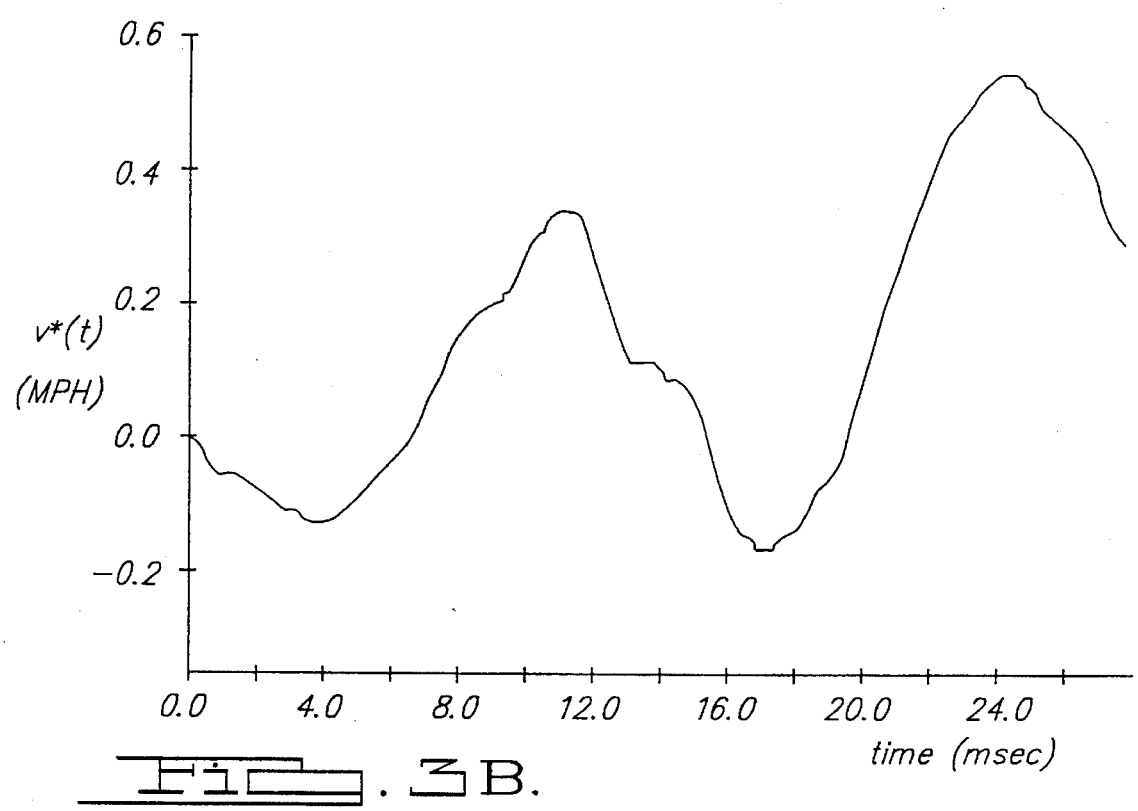

FIGS. 1A and 1B show a typical vehicle crash acceleration signal and a typical acceleration signal generated by a vehicle encountering rough road, respectively. FIGS. 2A and 2B show the integration of this waveform to produce velocity. It is noted that, for the first phases of a typical crash, the velocity varies linearly with time. FIGS. 3A and 3B shows the modified vehicle velocity v* calculated in the manner described hereinabove, with the vehicle velocity v* for the first phases of a typical crash similarly varying in proportion to time. As such, the modified velocity v* can be substituted for time t, as long as a scale factor can be used. Thus, under the instant invention, an event-based time measure is used in place of the timer or clock typically found in prior art physically-based systems. Stated another way, under the instant invention, a real event—the modified velocity v*—is used in place of a timer or clock, thereby reducing its dependence on start-up criteria: if the algorithm is started in the absence of any event, the modified velocity term v* remains zero, and the event-based time measure remains effectively zero. The system and method of the instant invention continue to check for an event. In contrast, start-up criteria are of critical importance to physically-based crash detection algorithms which otherwise simply continue unabated in the absence of any event.

Consider, for example, the rough road accelerator data illustrated in FIG. 1B and the plot of the resulting modified velocity v* illustrated in FIG. 3B: if a physically-based crash detection algorithm starts upon encountering the first "hump" in the waveform, the second "hump" will likely trigger deployment of the air bag, as such algorithms typically fail to check the data falling between the two humps. Stated another way, prior art physically-based algorithms are likely to think that the second hump is a mere continuation of the first hump, indicating a condition requiring deployment of the air bag. In contrast, with the instant system and method, the modified velocity v* first increases and then decreases to zero to "reset" its event-based algorithm. When the second hump occurs, the system and method recognizes it for what it is—a second event of small magnitude. Stated another way, since the modified velocity v* is proportional to time t, the modified velocity v* can be substituted for time t in the equation for a(t) to obtain the following:

$$a(t)=\hat{m}v*$$

where $\hat{m}$ is an estimate for m. Note that a scale factor is not required as the acceleration threshold is preferably adjusted to compensate for its absence.

FIG. 6 is an illustration of a general schematic 10 of an exemplary crash discriminator constructed in accordance with the instant invention. An analog output signal 12 from an acceleration sensor 14 is filtered with an anti-aliasing filter 16 and thereafter digitally sampled by an analog-to-digital converter 18.

The resulting digital acceleration data is stored in a FIFO RAM 20 of length N where it is divided into two equal halves. Both N/2 pieces are rank-order filtered to provide an estimate of that N/2 piece unaffected by spiky noise. Specifically, in the rank-order filter 22, a set of N samples are rearranged from top to bottom, i.e., in order of decreasing value. The top or rank value of N is given to the greatest valued sample. The sample with the least value is assigned a rank value of one. The rank-order filter 22 then outputs the lone data value corresponding to the user-designated rank R.

And, if R=(N+1)/2, the rank-order filter is called a median filter since it generates the median value as its output. The benefits of the rank-order/median filter is that any wild variance points are removed from the data. Spiky noise, EMI, and spiky crash data is thus smoothed before being processed using the instant method. Significantly, "edge data," i.e., data relating to a slant-up or a step function, is preserved through use of this filter, even though such edge data is typically of a high frequency.

Implementing the above filter:

A1=rank order filter of newest N/2 data samples

A2=rank order filter of oldest N/2 data samples

An estimate for the jerk m is obtained by subtracting A2 from A1, as follows:

$$\hat{m}=A1-A2$$

The rank-order filter output A2 is also used to calculate the modified velocity v* by subtracting a scale factor from A2 and then accumulating the result. The $\hat{m}$ and v* are then multiplied and the velocity-jerk product $\hat{m}v*$ is compared to two threshold values: if the velocity-jerk product $\hat{m}v*$ is greater than a first threshold corresponding to value z in FIG. 4, then a first flag a1 is set to logical one. If the velocity-jerk product $\hat{m}v*$ is greater than a second threshold corresponding to value w in FIG. 4, then a second flag a2 is set to logical one. The estimated jerk $\hat{m}$ is also compared to a third threshold corresponding to value x in FIG. 4: if the estimated jerk $\hat{m}$ is greater than x, flag s is set to logical one. The deployment of the air bag is triggered if (1) flag a2 is set to logical one; or (2) both flag s and flag a1 are set to logical one.

Figure 7:
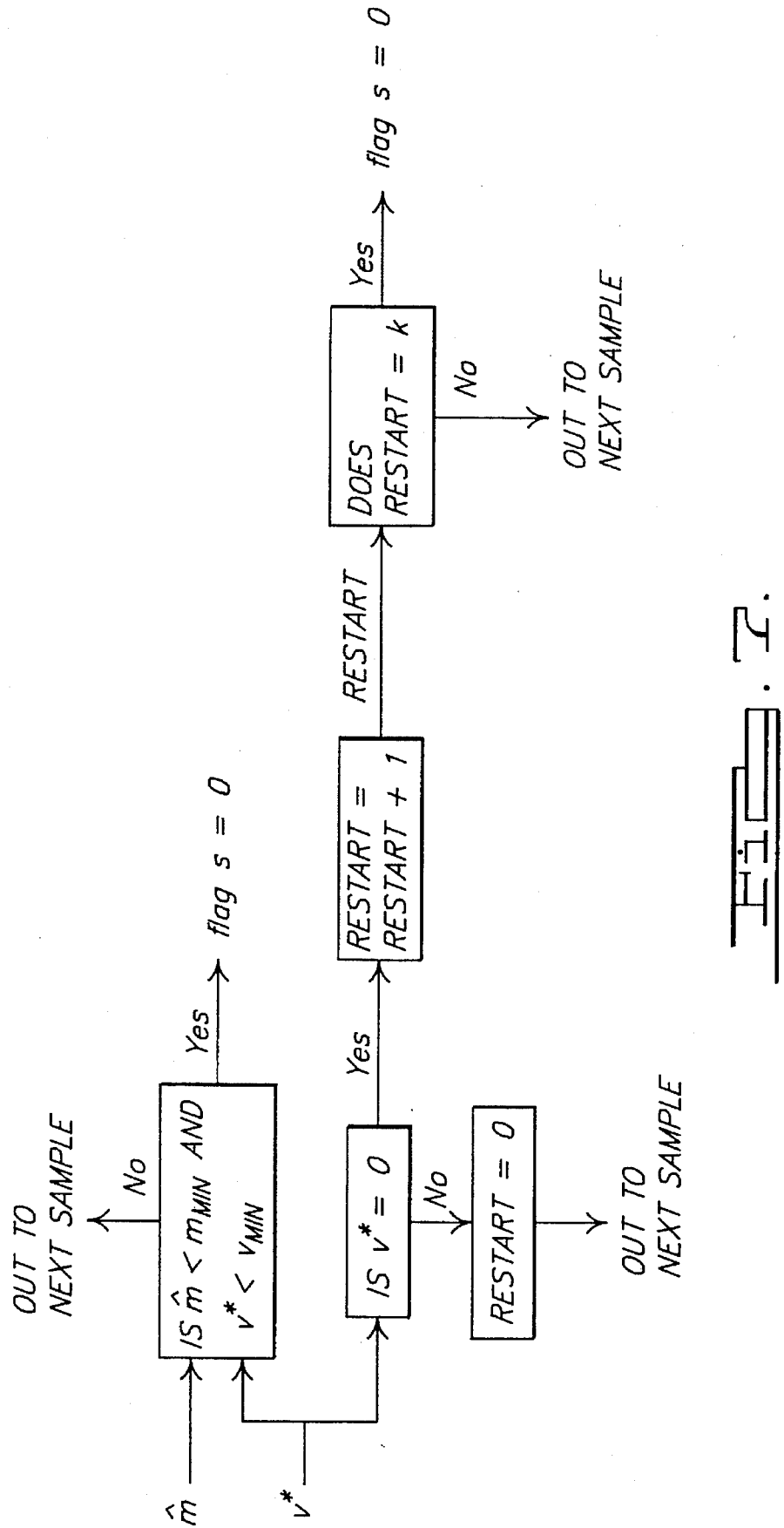
FIG. 7 contains the "drop-out" conditions for the system shown in FIG. 6.

FIG. 7 contains the "drop-out" conditions for the instant system. Specifically, flag s is set to logical zero when both a large negative value is calculated for the estimated jerk $\hat{m}$, i.e., the jerk $\hat{m}$ is less than a minimum value $m_{MIN}$ therefor, and the modified velocity v* is less than some small value, since this indicates that the vehicle is experiencing a large negative deceleration, thereby invalidating the earlier prediction of the jerk $\hat{m}$. The values $m_{MIN}$ and $v_{MIN}$ are predetermined based on crash sensor location within the vehicle, as well as the impact-absorptive characteristics of the vehicle in which the instant system is implemented. Additionally, flag s is preferably reset to zero if the modified velocity v* is equal to zero for k samples in a row, since as the earlier prediction for the jerk $\hat{m}$ will likewise have become invalid.

While the preferred embodiment of the invention has been disclosed, it should be appreciated that the invention is susceptible of modification without departing from the spirit of the invention or the scope of the subjoined claims.

We claim:

1. A method for triggering deployment or actuation of a vehicle safety device, said method comprising the steps of:

sampling data representative of instantaneous vehicle acceleration;

storing consecutive values of said acceleration data in a buffer;

correcting said consecutive values of said acceleration data by subtracting a correction value therefrom;

integrating said corrected acceleration data to determine a modified vehicle velocity value;

calculating a transitory jerk value based on said stored values of said acceleration data;

multiplying said modified vehicle velocity value and said transitory jerk value to obtain a modified, transitory velocity-jerk product;

comparing said velocity-jerk product with a first threshold value; and triggering deployment or actuation of said safety device when said velocity-jerk product exceeds said threshold value.

2. The method of claim 1, further including the steps of:

comparing said transitory jerk value with a second threshold value;

comparing said velocity-jerk product with a third threshold value of lesser magnitude than said first threshold value; and triggering deployment or actuation of said safety device when said transitory jerk value and said velocity-jerk product exceed said second and third threshold values, respectively.

3. A method for determining if an event requires actuation of a vehicle safety device, said method comprising the steps of:

receiving information representative of instantaneous vehicle acceleration;

determining a first measure which is evaluative of said received instantaneous vehicle acceleration information in relation to time;

determining a second measure correlated with the progress of said event based on said received acceleration information;

determining an estimated vehicle acceleration value based on said first measure and said second measure, wherein said second measure is used as a time value;

comparing said first measure with a first predetermined threshold value;

comparing said estimated acceleration value with a second predetermined threshold value;

comparing said estimated acceleration value with a second predetermined threshold value; and actuating said vehicle safety device if said first measure has exceeded said first predetermined threshold value and said estimated acceleration value has exceeded said second predetermined threshold value.

4. The method of claim 3 further comprising:

comparing said estimated vehicle acceleration value with a third predetermined threshold value, wherein said third predetermined threshold value is greater than said second predetermined threshold value; and actuating said vehicle safety device if said estimated acceleration value exceeds said third predetermined threshold value.

5. The method of claim 3 wherein said step of determining said first measure includes the step of determining a jerk value from the slope of said received acceleration information in relation to time.

6. The method of claim 5 further comprising the step of determining said second measure by integrating said received acceleration information to generate a vehicle velocity value, and wherein said estimated acceleration value is determined by multiplying said jerk value with said vehicle velocity value.

7. The method of claim 3 wherein said step of receiving comprises the steps of:

sampling said acceleration information; and storing said sampled information in a memory means as digital data.

8. The method of claim 7 further comprising the step of rank-order filtering said stored digital data, wherein said step of determining said first measure comprises generating a median rank-order value from said rank-order filtering.

9. The method of claim 3 wherein said first and said second predetermined threshold values are sequentially exceeded.

10. The method of claim 3 including the step of modifying said received acceleration information with a modification value, and wherein said received acceleration information is used in determining said first measure and said modified acceleration information is used in determining said second measure.

11. A system for determining if an event requires actuation of a vehicle safety device comprising:

sampling means for sampling raw information representative of instantaneous vehicle acceleration;

first determining means responsive to said received acceleration information for determining a first measure evaluative of said received acceleration information in relation to time;

second determining means responsive to said received acceleration information for determining a second measure correlated with the progress of said event;

second determining means responsive to said received acceleration information for determining a second measure correlated with the progress of said event;

third determining means responsive to said first measure and said second measure for determining an estimated vehicle acceleration value, wherein said second measure is used as a time value;

first comparing means responsive to said first measure for generating a first output signal if said first measure has exceeded a first predetermined threshold value;

second comparing means responsive to said estimated vehicle acceleration value for generating a second output signal if said estimated acceleration value has exceeded a second predetermined threshold value; and means for actuating said vehicle safety device in response to the generation of said first and said second output signals.

12. The system of claim 11 wherein said second comparing means generates a third output signal when said estimated acceleration value exceeds a third predetermined threshold value, said third predetermined threshold value being greater than said second predetermined threshold value; and wherein said actuating means actuates said vehicle safety device in response to the generation of said third output signal.

13. The system of claim 11 wherein said receiving means comprises:

a sampling means for generating N samples of said acceleration information; and a FIFO storage means for storing said N samples of information.

14. The system of claim 13 wherein said first determining means comprises:

a first rank-order filter for rank-order filtering a newest first set of samples stored in said storage means;

a second rank-order filter for rank-order filtering an oldest second set of samples stored in said storage means; and a first subtracting means connected to said first and said second rank-order filter for subtracting said second set of samples from said first set of samples to generate said first measure.

15. The system of claim 14 wherein said third determining means for determining said estimated acceleration value comprises:

a second subtracting means connected to said second rank-order filter for subtracting a scale factor from said second set of samples;

an accumulator means for accumulating the output of said second subtracting means; and a multiplying means connected to said accumulator means and said first subtracting means for generating said estimated vehicle acceleration value.

16. A method of predicting vehicle acceleration information for determining if an event requires actuation of a vehicle safety device, said method comprising the steps of:

sampling raw information representative of instantaneous vehicle acceleration;

damping said sampled acceleration information with a predetermined scale factor;

determining a first measure evaluative of said sampled acceleration information in relation to time;

determining a second measure correlated with the progress of said event;

determining an estimated acceleration value by multiplying said first measure with said second measure;

comparing said estimated acceleration value of a predetermined threshold value; and actuating said vehicle safety device if said estimated acceleration exceeds said predetermined threshold value.

17. The method of claim 16 wherein said scale factor is a predetermined constant representative of an acceleration which a passenger can be expected to withstand without requiring actuation of said vehicle safety device.

18. The method of claim 16 wherein said scale factor is based on a function of time representative of an acceleration which a passenger can be expected to withstand without requiring actuation of said vehicle safety device.

19. The method of claim 16 wherein said step of determining said first measure includes the step of determining a jerk value from the slope of said sampled acceleration information in relation to time.

* * * * *